United States Patent [19]

Croonenbrock et al.

[11] Patent Number: 5,051,040

[45] Date of Patent: Sep. 24, 1991

[54] FLUIDIZED BED COMBUSTION SYSTEM THAT IS CONTROLLABLE UNDER PRESSURE

[75] Inventors: Raimund Croonenbrock, Engelskirchen; Horst Müller, Bergneustadt; Hubert Steven, Gummersbach; Bernd Sudau, Stade, all of Fed. Rep. of Germany

[73] Assignee: L. & C. Steinmüller GmbH, Gummersbach, Fed. Rep. of Germany

[21] Appl. No.: 518,914

[22] Filed: May 4, 1990

[51] Int. Cl.⁵ ............................................. B65G 53/46
[52] U.S. Cl. ........................................ 406/63; 406/127
[58] Field of Search ......................... 406/62, 63, 64, 66, 406/74, 52, 108, 120, 127; 222/636, 637, 370; 414/219, 220

[56] References Cited

U.S. PATENT DOCUMENTS

| | | | |
|---|---|---|---|
| 4,087,214 | 5/1978 | Kushner et al. | 406/63 |
| 4,176,987 | 12/1979 | Reed et al. | 406/63 |
| 4,354,777 | 10/1982 | Richter et al. | 406/63 |
| 4,705,433 | 11/1987 | Br/ nnström | 406/63 |

Primary Examiner—Sherman D. Basinger
Assistant Examiner—Stephen P. Avila
Attorney, Agent, or Firm—Robert W. Becker & Associates

[57] ABSTRACT

A fluidized bed combustion system that can be operated or controlled under pressure is provided. To eliminate the erosion or abrasion to which heat exchangers located in a fluidized bed combustion chamber are subjected due to the flue dust contained in the flue gas, no thermal withdrawal or exchange takes place in the combustion chamber of the inventive fluidized bed combustion system, although the reaction conditions remain the same. At least one controllable line for returning to the combustion chamber part of the flue gas, if necessary cooled by heat exchangers variously arranged outside the combustion chamber, branches off from the flue gas line downstream of a dust separator that is disposed in the flue gas line downstream of the combustion chamber. The main area of application is the production of electrical energy and heat for the generation of steam, as process heat, or as heat for a remote site, by means of a fluidized bed combustion system that can be operated or controlled under pressure.

8 Claims, 4 Drawing Sheets

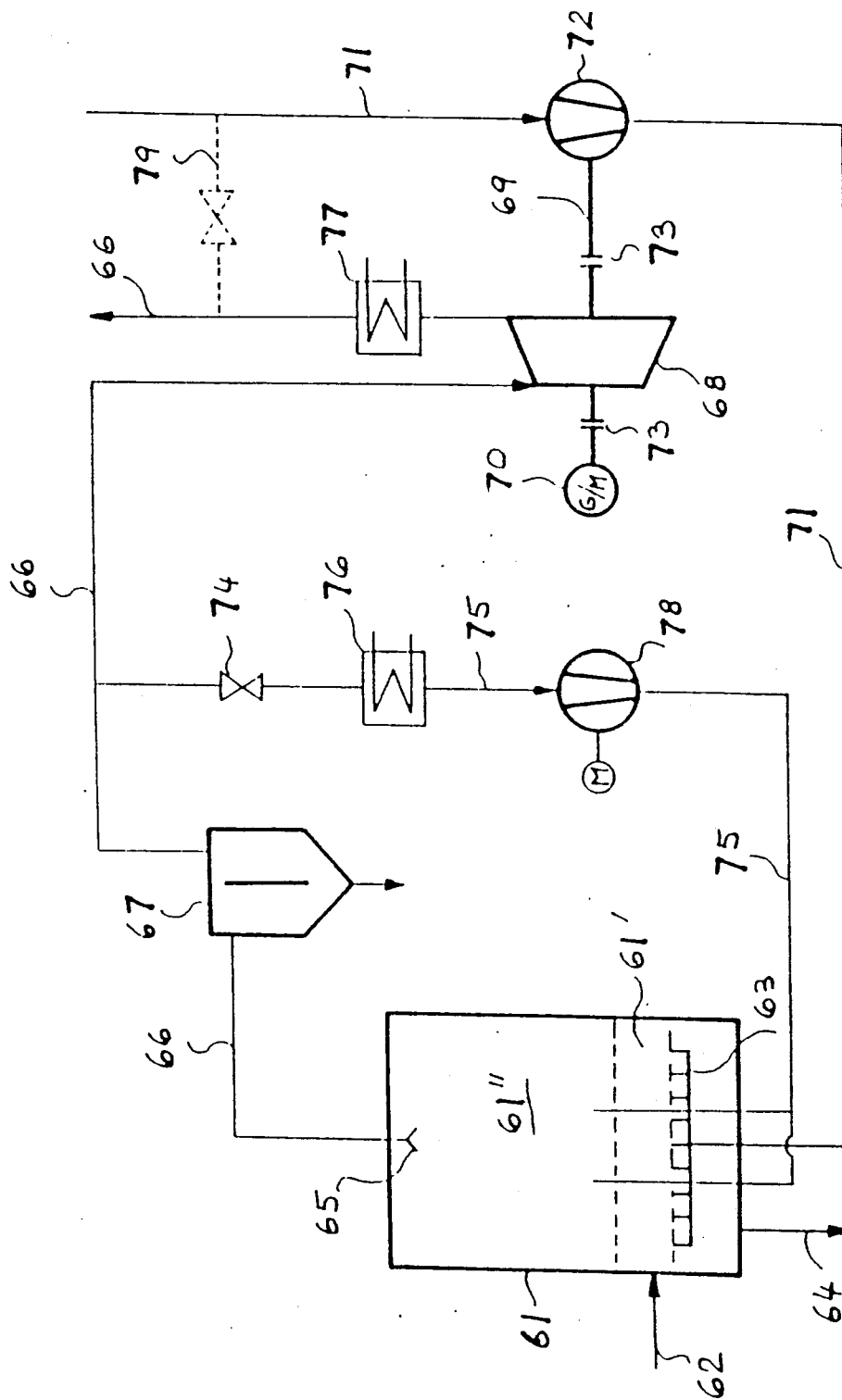

FLUIDIZED BED COMBUSTION SYSTEM THAT IS CONTROLLABLE UNDER PRESSURE

BACKGROUND OF THE INVENTION

The present invention relates to a fluidized bed combustion system that can be operated or controlled under pressure and includes a combustion chamber, a flue gas line leading therefrom in which is disposed a dust separator, an air compressor that is disposed in a line for air for combustion and is connected on the same shaft as an expansion turbine that is disposed in the flue gas line, with at least one controllable line, for returning a cooled portion of flue gas to the combustion chamber, branching off from the flue gas line downstream of the dust separator.

U.S. Pat. No. 4,705,433 discloses a fluidized bed combustion system of this general type where the returned flue gas is used as an inert transport gas for the fuel that is to be burned in the fluidized bed combustion system. Disposed in the combustion chamber is a heat-transfer surface assembly for withdrawing heat from the combustion chamber. The flue gas that is not used to transport fuel is expanded in an expansion turbine that drives an air compressor.

German Offenlegungsschrift 35 36 451 discloses a fluidized bed combustion system whereby during operation flue gas at a high temperature, preferably the combustion chamber temperature, is fed through an expansion turbine that on the same shaft is connected via at least one coupling to an air compressor that is disposed in an air line and to an electrical machine. In this connection, the electrical machine can be operated as a drive motor for the air compressor, or as a generator. This type of combustion system is always used in a combination gas and steam turbine process because the heat released in the combustion chamber is proportionately used in an arrangement that comprises several heat-transfer surfaces for generating steam and for heating the withdrawn flue gases.

In order to also be able to adjust the reaction temperature of about 850° C. that generally prevails in the fluidized bed with a view to the formation of environmental pollutants in the flue gas, such as $NO_x$, the combustion chamber of the fluidized bed combustion system is tied into the water/steam circulation of the steam generation. Due to a relatively high flue dust content in the flue gas in conjunction with a high reaction temperature in the combustion chamber of the fluidized bed combustion system, the heat exchangers and heat-transfer surfaces required for this are greatly affected by erosion and abrasion.

It is an object of the present invention to design a fluidized bed combustion system that can operate or be controlled under pressure in such a way that no heat exchangers and heat-transfer surfaces are disposed in the combustion chamber of the fluidized bed combustion system, yet the reaction conditions required for a minimum formation of pollutants are maintained.

BRIEF DESCRIPTION OF THE DRAWINGS

This object, and other objects and advantages of the present invention, will appear more clearly from the following specification in conjunction with the accompanying schematic drawings, in which:

FIG. 4 is a system diagram of a further exemplary embodiment of the inventive fluidized bed combustion system, with a flue gas return line branching off upstream of the expansion turbine and opening out in a free space of a stationary fluidized bed.

SUMMARY OF THE INVENTION

Figure 1:
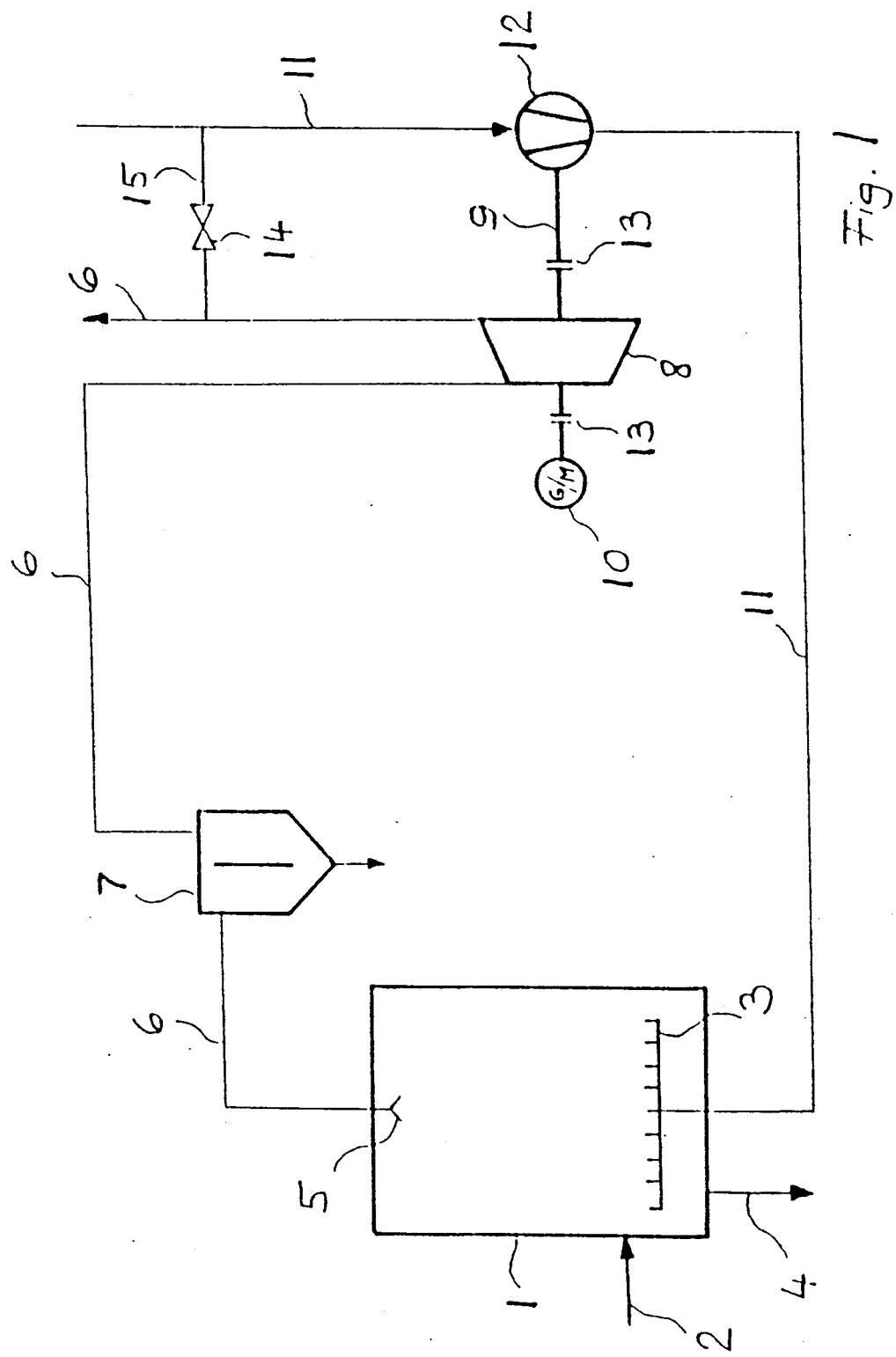
FIG. 1 is a system diagram of one exemplary embodiment of the inventive fluidized bed combustion system, with the flue gas return line branching off from the flue gas line downstream of an expansion turbine.

The fluidized bed combustion system of the present invention is characterized primarily by a combustion chamber that is free of heat exchangers and heat-transfer surfaces, and by means to control the branch line as a function of the flue gas temperature that exists where this branch line branches off, with the branch line returning cooled flue gas to the combustion chamber via feed means for air for combustion into which the line for air for combustion opens, with the flue gas being cooled via expansion in the expansion turbine, which is connected on the same shaft as an electrical machine, and/or via heat exchange means.

By feeding part of the flue gas back into the fluidized bed via the means for feeding air for combustion, it is possible, as a function of the flue gas temperature that prevails in the flue gas line where the line branches off, to precisely set the reaction temperature in the fluidized bed that is critical for a minimum formation of pollutants via means for controlling the quantity of flue gas in the flue gas return line. This eliminates cooling of the combustion chamber via heat-transfer surfaces or heat exchangers in the fluidized bed and on the combustion chamber walls thereof through which water/steam circulates, so that all of the heat released in the fluidized bed combustion system is withdrawn by the flue gas that flows out of the combustion chamber. The line for providing the return of flue gas can be disposed downstream of a dust separator in various ways.

For example, it may be expedient for the flue gas return line to connect the flue gas line, downstream of the expansion turbine, with the line for air for combustion, upstream of the air compressor.

On the other hand it may also be expedient for the flue gas return line to connect the flue gas line, upstream of the expansion turbine, with the line for air for combustion, downstream of the air compressor, with a heat exchanger and a pressure boosting fan being disposed in the flue gas return line.

Alternatively, where a stationary fluidized bed is provided above which is disposed a free space, it may be expedient for the flue gas return line to connect the flue gas line, upstream of the expansion turbine, with the free space. By mixing returned flue gas in the free space to flue gas coming from the fluidized bed, the formation of pollutants, especially the formation of $NO_x$, can be controlled.

With respect to the last two mentioned possibilities for the disposition of the flue gas line, it can be further-more expedient for a further controllable flue gas return line to connect the flue gas line, downstream of the expansion turbine, with the air for combustion, upstream of the air compressor.

All of the aforementioned possibilities for arranging the flue gas line are equally suitable for exclusively obtaining electrical energy by using the electrical machine as a generator. However, the use of a specific arrangement of a flue gas return line should be considered if it is essential that the returned quantity of flue gas be kept to a minimum, and at the same time a specific quantity of heat at a specific temperature level be available for a given purpose, for example to generate steam, make process heat available, or make heat available to a remote site.

In the situation where the flue gas return line branches off downstream of the expansion turbine, it is expedient to dispose a heat exchanger in the flue gas line downstream of the expansion turbine and upstream of where the flue gas return line branches off. By means of this heat exchanger, a relatively large quantity of heat at a low temperature level can be withdrawn, especially for making heat available to a remote site.

Where the flue gas return line branches off upstream of the expansion turbine, it is expedient to dispose heat exchangers in the flue gas line between the dust separator of the fluidized bed combustion system and the inlet of the expansion turbine, preferably between where the flue gas return line branches off and the inlet of the expansion turbine, and/or in the flue gas return line that branches off upstream of the expansion turbine. Such an arrangement of heat exchangers also makes it possible to make a large and/or small quantity of heat, both at a high temperature level, available for the generation of steam or as process heat, either alone or in combination with a withdrawal of heat downstream of the expansion turbine.

The use of heat exchangers disposed upstream and/or downstream of an expansion turbine makes it possible to withdraw heat in a precise manner as a substitute for the direct utilization of heat in the combustion chamber of the fluidized bed combustion system. In contrast to heat exchangers disposed directly in the combustion chamber of a fluidized bed combustion system, the risk of erosion and abrasion of the inventively arranged heat exchangers is avoided due to the prior separation of dust.

Further specific features of the present invention will be described in detail subsequently.

DESCRIPTION OF PREFERRED EMBODIMENTS

Referring now to the drawings in detail, FIG. 1 illustrates one exemplary embodiment of a fluidized bed combustion system that is controllable under pressure and has a combustion chamber 1 that is free of heat exchangers and heat-transfer surfaces, and includes mechanisms for supplying fuel and air for combustion 3, as well as an ash discharge 4 and a flue gas discharge 5 that is provided on the outlet side and leads to a flue gas line 6, a dust separator 7, and an expansion turbine 8. Via two couplings 13, the expansion turbine 8 is disposed on the same shaft 9 as an electrical machine 10 and is connected with an air compressor 12 that is disposed in a line 11 for air for combustion; this line 11 opens into the mechanism for the air for combustion 3. Depending upon the operating mode, the electrical machine 10 is designed to operate as a motor or as a generator, with use as a motor being required primarily during start-up. Branching off from the flue gas line 9 that is coming from the expansion turbine 8 is a flue gas feedback or return line 15 that can be controlled by a valve 14 and opens out into the line 11 for air for combustion ahead of the air compressor 12.

By means of the air compressor 12, air for combustion is drawn in from the atmosphere through the line 11; this air is compressed to the required pressure, and is fed to the fluidized bed combustion chamber 1 via the mechanism for air for combustion 3. In this connection, part of the expanded flue gas coming from the expansion turbine 8 is mixed with the drawn-in air for combustion upstream of the air compressor 12. The quantity of returned flue gas, which serves to influence the reaction temperatures in the combustion chamber 1 of the fluidized bed combustion system with a view to the formation of environmental pollutants, is determined by the heat that is to be removed from the fluidized bed combustion chamber 1 and by the specific energy of the expanded flue gas coming from the expansion turbine 8. The embodiment of a fluidized bed combustion system illustrated in FIG. 1 can be used when exclusively electrical energy is to be obtained from the electrical machine 10 operating as a generator. To keep the quantity of returned flue gas to a minimum, and to utilize the heat removed in the flue gas for a great variety of purposes, a heat collector may be provided in the process.

Figure 2:
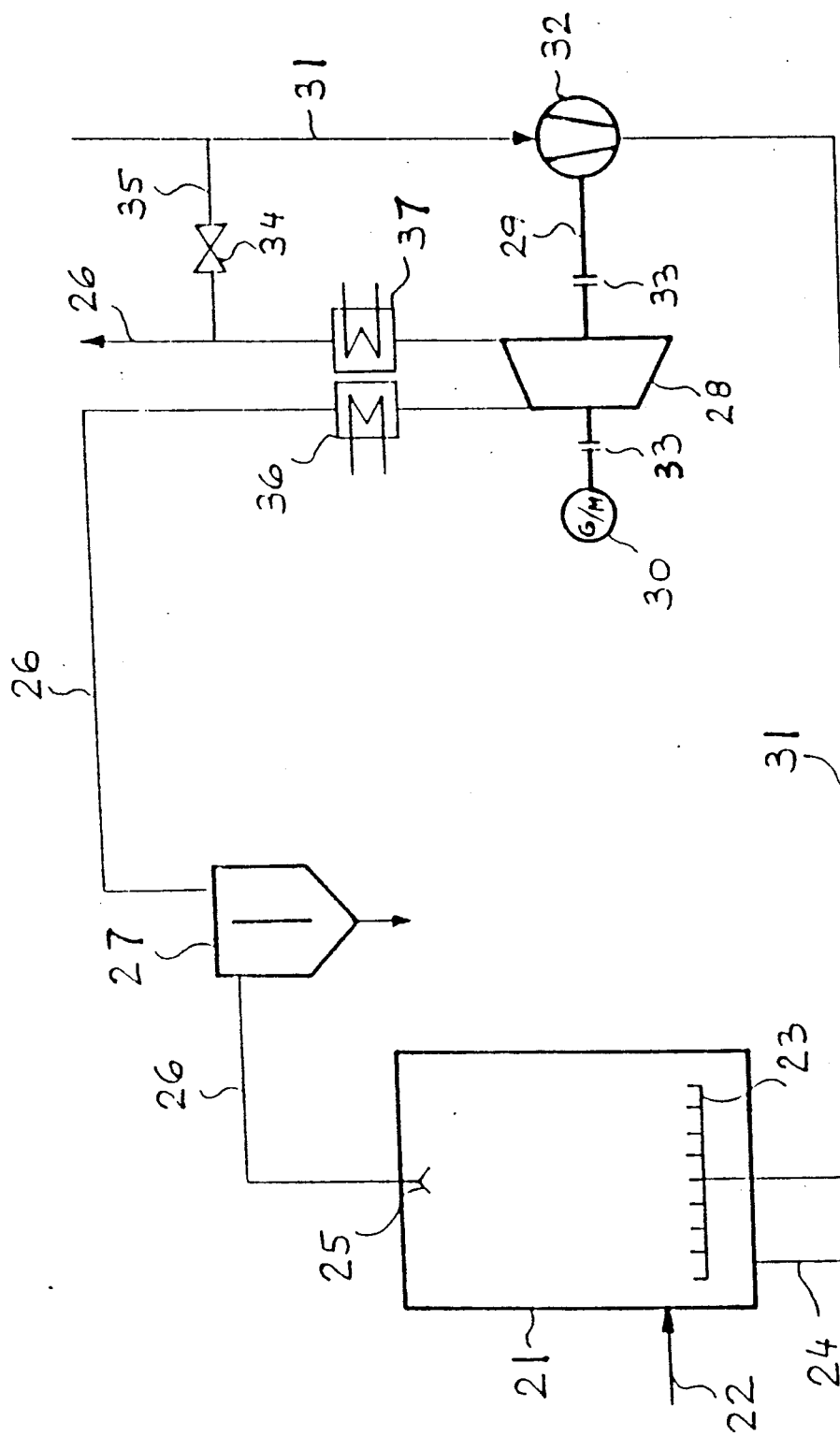
FIG. 2 is a system diagram similar to that of FIG. 1, with respective heat exchangers being provided in the flue gas line upstream and/or downstream of an expansion turbine.

Pursuant to the embodiment illustrated in FIG. 2, which shows a system diagram that is comparable to that of FIG. 1, respective heat exchangers 36, 37 are disposed in a flue gas line 26 upstream and/or downstream of an expansion turbine 28. By means of the heat exchanger 36, a small quantity of heat at a high temperature level is drawn off to generate steam or to make process heat available; by means of the heat exchanger 37, a large quantity of heat at a low temperature level is drawn off to make heat available at a remote location.

Figure 3:
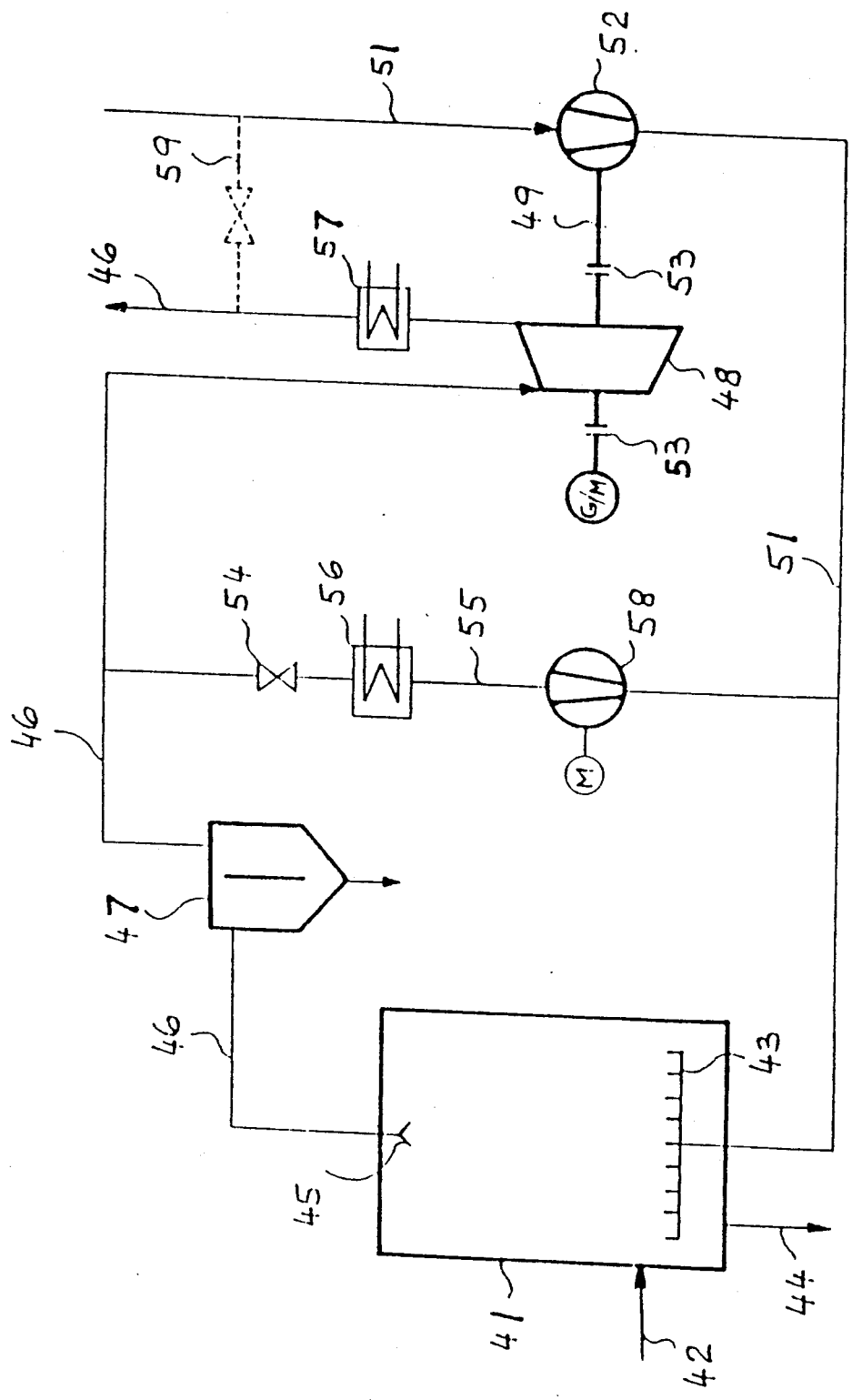
FIG. 3 is a system diagram of another exemplary embodiment of the inventive fluidized bed combustion system, with the flue gas return line branching off from the flue gas line upstream of an expansion turbine, and with respective heat exchangers being disposed in the flue gas return line, and in the flue gas line downstream of the expansion turbine.

As an alternative to the embodiments illustrated in FIGS. 1 and 2, pursuant to the embodiment of FIG. 3 a flue gas return line 55 can branch off from a flue gas line 46 between a dust separator 47 and an expansion turbine 48. This flue gas return line 55, which is controlled by a valve 54, opens out into a line 51 for air for combustion that is disposed between an air compressor 52 and a mechanism for air for combustion 43 in the combustion chamber 41 of a fluidized bed combustion system that can be controlled under pressure. A heat exchanger 56 and a pressure boosting fan 58 are disposed in the flue gas return line 55. A further heat exchanger 57 for withdrawing heat is disposed in the flue gas line 46 downstream of the expansion turbine 48. Pursuant to this system diagram, a partial quantity of flue gas that is to be returned to the fluidized bed combustion chamber 41 is withdrawn from the flue gas line 46 upstream of the expansion turbine 48, is cooled in the heat exchanger 56, and after the gas pressure thereof has been increased by the pressure boosting fan 58, is mixed with the air for combustion that is being conveyed through the line 51 and is compressed in the air compressor 52. The heat exchanger 56 that is disposed upstream of the expansion turbine 48 can make available a large quantity of heat at a high temperature, whereas the heat exchanger 57 disposed downstream of the expansion turbine 48 can make available a relatively large quantity of heat at a lower temperature.

As an alternative to the embodiment of FIG. 3, in the embodiment of FIG. 4, a flue gas return line 75, which branches off from a flue gas line 66 disposed between a dust separator 67 and an expansion turbine 68, can convey flue gas to the combustion chamber 61 of a fluidized bed combustion system that can be controlled under pressure separately from the air line 71 that conveys compressed air for combustion and connects an air compressor 72 and a mechanism for air for combustion 63. In this case, the flue gas return line 75 opens out into a free space 61" of the fluidized bed combustion chamber 61, thus permitting a portion of the flue gas to be returned to the fluidized bed combustion system without affecting the combustion process that is taking place in the fluidized bed.

With each of the exemplary embodiments described in conjunction with FIGS. 3 and 4, it is also possible to provide a further, possibly valve-controlled, flue gas return line 59, 79 (indicated by dotted lines) that is disposed in such a way that it connects the flue gas line 46, 66, downstream of the expansion turbine 48, 68, with the line for air for combustion 51, 71, upstream of the air compressor 52, 72. With regard to the arrangement of heat exchangers provided for the withdrawal of heat, with the described systems, depending upon requirements, for example the generation of steam, or the making available of process heat or heat at a remote site, it is also possible to dispose heat exchangers outside the combustion chamber of a fluidized bed combustion system that is controllable under pressure, i.e. downstream of a dust separator, individually or in combination in the flue gas line upstream and/or downstream of an expansion turbine and/or in a flue gas return line.

The present invention is, of course, in no way restricted to the specific disclosure of the specification and drawings, but also encompasses any modifications within the scope of the appended claims.

What we claimed is:

1. In a fluidized bed combustion system that is controllable under pressure and includes a combustion chamber, a flue gas line leading therefrom in which is disposed a dust separator, and an air compressor that is disposed in a line for air for combustion and is connected on the same shaft as an expansion turbine that is disposed in said flue gas line, with at least one controllable return line, for returning a cooled portion of flue gas to said combustion chamber, branching off from said flue gas line downstream of said dust separator, the improvement wherein:

said combustion chamber is free of heat exchangers and heat-transfer surfaces; and means are provided to control said flue gas return line as a function of the flue gas temperature that exists where said return line branches off, with said flue gas return line returning cooled flue gas to said combustion chamber via a feed mechanism for air for combustion into which said line for air for combustion opens, with said flue gas being cooled via expansion in said expansion turbine, which is connected on the same shaft as an electrical machine, and/or via heat exchange means.

2. A fluidized bed combustion system according to claim 1, in which said flue gas return line connects said flue gas line, downstream of said expansion turbine, with said line for air for combustion, upstream of said air compressor.

3. A fluidized bed combustion system according to claim 1, in which said flue gas return line connects said flue gas line, upstream of said expansion turbine, with said line for air for combustion, downstream of said air compressor; and in which a heat exchanger and a pressure boosting fan are disposed in said flue gas return line.

4. A fluidized bed combustion system according to claim 3, which includes a further controllable flue gas return line that connects said flue gas line, downstream of said expansion turbine, with said line for air for combustion, upstream of said air compressor.

5. A fluidized bed combustion system according to claim 1, in which a heat exchanger is disposed in said flue gas line downstream of said expansion turbine and upstream of where said flue gas return line branches off.

6. A fluidized bed combustion system according to claim 1, which includes heat exchange means in said flue gas line between said dust separator and inlet means of said expansion turbine.

7. A fluidized bed combustion system according to claim 1, which includes heat exchange means disposed between said dust separator and said combustion chamber.

8. A fluidized bed combustion system according to claim 7, in which said flue gas return line branches off from said flue gas line upstream of inlet means of said expansion turbine, with said heat exchange means being disposed in said flue gas line between where said flue gas return line branches off and said inlet means of said expansion turbine, and/or in said flue gas return line.

* * * * *